United States Patent [19]

Blandford

[11] Patent Number: 4,792,695
[45] Date of Patent: Dec. 20, 1988

[54] CONTACT-FREE MEASURING APPARATUS HAVING AN F-THETA-CORRECTED, CATADIOPTRIC OBJECTIVE AND METHOD FOR USING THE SAME

[75] Inventor: Brian Blandford, London, England

[73] Assignee: Zumbach Electronic AG, Orpund, Switzerland

[21] Appl. No.: 885,874

[22] Filed: Jul. 14, 1986

[30] Foreign Application Priority Data

Jul. 24, 1985 [CH] Switzerland ............... 03219/85

[51] Int. Cl.⁴ ................. G01N 21/86; H01J 3/14
[52] U.S. Cl. ....................... 250/560; 250/236; 356/387; 350/444; 350/6.8
[58] Field of Search ........... 356/387, 386, 384, 385; 250/560, 234, 235, 236; 350/444, 442, 415, 431, 6.8, 6.5, 6.7

[56] References Cited

U.S. PATENT DOCUMENTS

| | | | |
|---|---|---|---|
| 3,520,586 | 7/1970 | Bousky | 250/235 |
| 3,667,360 | 6/1972 | Vicik | 350/444 |
| 3,825,322 | 7/1974 | Mast | 350/444 |
| 3,858,046 | 12/1974 | Cubalchini | 350/442 |
| 4,188,091 | 2/1980 | Fujii | 350/444 |
| 4,196,961 | 4/1980 | Walter et al. | 356/386 |
| 4,342,503 | 8/1982 | Shafer | 350/444 |
| 4,487,483 | 12/1984 | Versteeg | 350/444 |
| 4,508,422 | 4/1985 | Karlsson | 250/236 |
| 4,639,141 | 1/1987 | Kuwabara et al. | 356/387 |
| 4,717,823 | 1/1988 | Steimel et al. | 250/236 |

FOREIGN PATENT DOCUMENTS

| | | | |
|---|---|---|---|
| 0111402 | 7/1982 | Japan | 356/387 |
| 1142732 | 2/1985 | U.S.S.R. | 356/386 |

*Primary Examiner*—David C. Nelms
*Assistant Examiner*—Michael Messinger

[57] ABSTRACT

An apparatus for the non-contacting measurement of rod-shaped objects contains a telecentric, F-theta-corrected objective which comprises two catadioptric elements. The first catadioptric element is a Mangin mirror and the second catadioptric element is a plane plate mirror-coated at the front, while a third optical element is a meniscus lens. The use of catadioptric elements permits a simplified and inexpensive form of construction which is also compact, as a result of which objects with large dimensions can be measured quickly and accurately. Such an apparatus serves, in particular, for the continuous control of the production of filament-shaped objects.

11 Claims, 2 Drawing Sheets

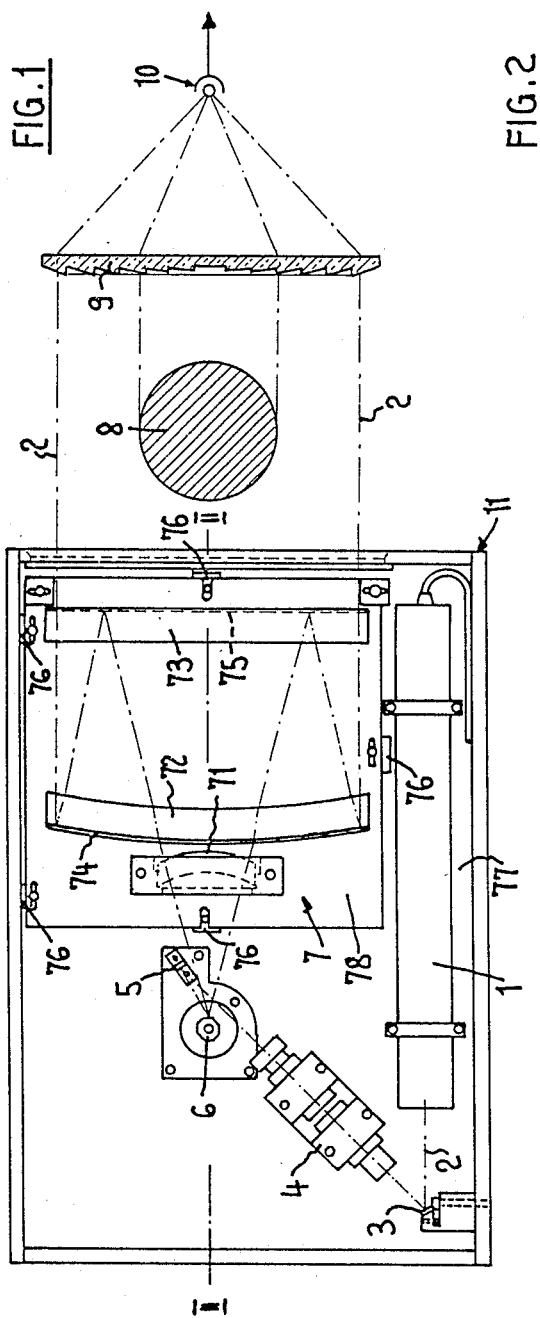

CONTACT-FREE MEASURING APPARATUS HAVING AN F-THETA-CORRECTED, CATADIOPTRIC OBJECTIVE AND METHOD FOR USING THE SAME

BACKGROUND OF THE INVENTION

There are various apparatuses and methods for the noncontacting measurement and control of objects, for example of objects in the form of threads, wire, rods or tubes, wherein, as a rule, a modulated beam of light, generally a laser beam, is guided over the object and focussed on a photodetector, the shading time recorded by the photodetector being, under certain conditions, a measure of the dimension of the object to be measured. Bringing about as linear a function as possible between the dimension to be measured and the shading time can be achieved in various ways, including the use of a suitable objective. In this case, with increasing measuring speed and increasing size of the object to be measured, ever greater demands are made on the measuring system and on the optical system. An objective which can be used for such measuring purposes is a telecentric F-theta-corrected objective. This means that the emergent central ray of the laser beam lies parallel to the optical axis for all angles of deflection during the scanning and that there is a linear relationship between this angle of deflection for the entering beam and the linear height of the image space. Known telecentric systems have the disadvantage, however, that the costs of the objective rise very steeply on enlargement of the field of measurement and it is therefore the object of the present invention to provide a measuring apparatus having a telecentric, F-theta-corrected objective which can be produced economically and permits rapid and accurate measuring and monitoring.

SUMMARY OF THE INVENTION

The present invention accordingly provides an apparatus for contact-free measuring, comprising a telecentric, F-theta-corrected objective, wherein the objective comprises catadioptric elements

BRIEF DESCRIPTION OF THE DRAWINGS

The invention is illustrated by way of example in the following drawings.

FIG. 1 shows, diagrammatically, an apparatus according to the invention for the continuous measurement of the diameter of an object in the form of a filament.

FIG. 2 shows, on an enlarged scale, a section on II—II of FIG. 1,

DETAILED DESCRIPTION OF PREFERRED EMBODIMENT

Figure 3:
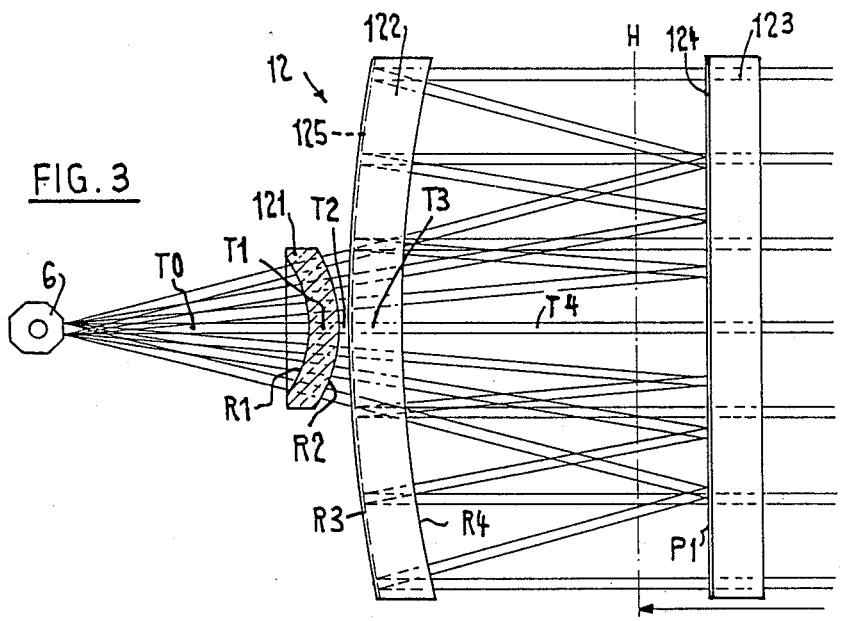
FIGS. 3 and 4 show, diagrammatically, a second embodiment of an objective according to the invention in two sections

During the continuous measurement of objects in the form of filaments, the object traverses a region which is crossed by an optical beam, for example of a laser, the scanning plane of which is perpendicular to the direction of travel of the material and masks the beam for a period of time which depends on the geometry of the beam and the dimensions of the material. For an effective measurement of the parameter in question, for example the diameter of the object, various conditions must be fulfilled:

(a) the diameter of the beam must be small enough to obtain a steep rise and fall time of the detector signal, (b) the scanning speed must be high with respect to the longitudinal movement of the material and very high with respect to lateral movements of the scanning direction, (c) the beam must be perpendicular to the object before and after the shading period, (d) the movement of the object parallel to the measuring beam must not impair the reading;

(e) the shading time should be a linear function of the diameter of the object, regardless of its position within the scanning period of the field of measurement.

The first three conditions can be fulfilled by a laser beam which is reflected by a polygonal mirror which rotates at a constant speed. The conditions (d) and (e) are fulfilled if the objective, which projects the laser beam onto the object of measurement, is telecentric in construction, that is to say if the principal ray remains parallel to the axis for all scanning angles. The last condition presupposes that the objective is F-theta-corrected, that is to say that the height of the beam emerging from the objective has a linear relationship to the angle of the beam entering the objective.

If these conditions can be fulfilled, the measurement of the diameter can be carried out by a simple measurement of the shading period, as a result of which an expensive digital calculation is avoided. As initially mentioned, F-theta-corrected telecentric objectives become very expensive if the field of measurement, that is to say the maximum height of the emergent beam, is great, that is to say if the detection of objects to be measured that have relatively large dimensions is concerned. A measuring apparatus and, in particular, a measuring objective, which permits a simple and therefore economical form of construction is explained in more detail below.

The proposed solution amounts to using a catadioptric, telecentric, F-theta-corrected objective. The use of two reflecting surfaces makes it possible to reduce the number of elements because the elements present are traversed twice or even three times by the laser beam. The problem is made additionally more difficult, however, as a result of the fact that, in contrast to conventional catadioptric objectives, no obscuring of the beam must take place.

FIG. 1 shows diagrammatically, one possible construction of an apparatus according to the invention for the continuous detecting of one dimension, for exanple the diameter, of an object, for example a filament produced continuously. A laser 1 can be seen, for example a helium-neon laser, the beam 2 of which is deflected, by a first deflecting mirror 3, through a widening optical system 4 which widens the beam of the laser to a beam of, for example, 4 mm in diameter. From the widening optical system 4, the beam reaches a second deflecting mirror 5 and from there a polygonal mirror 6 which, with a constant speed of rotation, deflects the laser beam in known manner at a specific frequency and at a specific angle. It is clear that neither the number and arrangement of the deflecting mirrors nor the arrangement of the widening optical system is imperative but results from the particularly compact construction of the apparatus. From the revolving mirror 6, the scanning beam passes through the objective 7 which, in the present example, consists of three elements 71, 72, 73 and will be described more fully below with reference to FIGS. 3 and 4. The optical element 71 is a meniscus lens, the optical element 72 is a Mangin mirror and the optical element 73 is a plane-parallel plate. From the lens, the beam passes to the object 8 to be measured and from there through a collecting lens, for example a Fresnel lens 9, to a photodetector 10. The evaluation electronic system, known per se, which is naturally in communication with the revolving mirror, will not be gone into within the scope of this invention.

Various measures can be taken to prevent the beam from being obscured. For example, a coating which is only partially reflecting may be carried out or the optical beam may be displaced to the side of the optical axis or the reflecting elements may be tilted slightly. In the objective shown in FIGS. 1 and 2, partially reflecting coatings 74 are used on the Mangin mirror 72 and 75 on the reflecting plate 73 and a slight tilting both of the Mangin Mirror 72 and of the reflecting plate 73 is carried out for seconds and a few minutes respectively.

Obscuring of the beam can be avoided by the partial coating and the slight tilting of the reflecting elements. In addition, it should be noted in connection with this embodiment that the partial coating 75 on the reflecting plate is disposed on the rear face of this plate as seen from the revolving mirror. In this arrangement, the optical elements are mounted individually and secured by means of suitable holding means 76 on an adjustable plate 78 which is held on the base plate 77 of a housing 11 comprising the whole optical arrangement.

Figure 4:
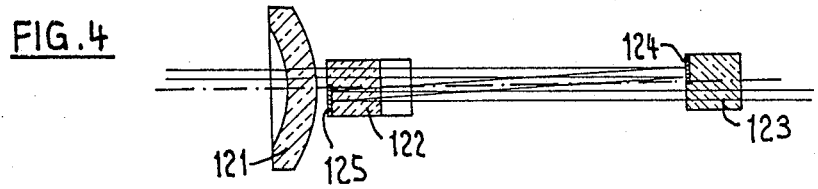

A preferred embodiment of a telecentric, F-theta-corrected objective is shown in FIG. 3. The optical elements of this objective are mounted, in conventional manner, in a centred mount and the incoming beam is offset and bent at an angle in relation to the optical axis of the objective in order to obtain a scanning region free of obscuration. The revolving mirror 6, the first optical element, the meniscus lens 121, the second optical optical element, the Mangin mirror 122, and the third optical element, the plane plate 123, can be seen. The meniscus lens 121 has a first refracting surface with radius R1 and a second refracting surface with radius R2. The Mangin mirror has a first reflecting surface with radius R3 and a second surface with radius R4, while in this embodiment, the first surface P1 of the plane mirror 123 is provided with a reflecting layer 124. The reflecting layer 124 only extends over a portion of the plane plate. Similarly, the first surface of the Mangin mirror, with radius R3, is not completely provided with a reflecting layer 125. As can be seen from FIG. 4, the reflecting layers 124 and 125, viewed perpendicular to the plane of FIG. 3, extend over half of each of the two surfaces in question. The various distances and thicknesses which are important for the calculation of the elements of the objective are given by T0, T1, T2, T3 and T4. The thickness of the plane plate 123 plays no part in the present example. The path of rays can easily be seen from FIG. 3.

The beam of light, offset and inclined in relation to the optical axis of the objective, for example by a deflecting mirror (5 in FIG. 1), passes from the revolving mirror through the meniscus correction element, passes through the transmissive region of the Mangin mirror and is reflected by the reflecting layer 124 on the surface P1 of the plane plate 123, reaches the reflecting surface 125 with radius R3 through the Mangin mirror and is projected through the Mangin mirror onto and through the plane plate 123 and leaves the objective as a telecentric, F-theta-corrected beam, to fall on the object to be measured. In the following Tables 1 and 2, a range for the decisive values for the calculation are given, within which an F-theta-corrected beam can be achieved which has the necessary characteristics to be able to determine the required dimension of the object to be measured, quickly and with great accuracy. The precise values then depend, inter alia, on the glass used.

TABLE 1

(construction data)

| Radius of curvature | Thickness or spacing | Refractive index | Radius aperture |
|---|---|---|---|
| Entrance | | | .0087 |
| | $0.20 < T0 < 0.275$ | | |
| $-0.150 < R1 < -0.105$ | | | .0708 |
| | $0.032 < T1 < 0.040$ | $1.48 < n1 < 1.55$ | |
| $-0.185 < R2 < -0.155$ | | | .0818 |
| | $0.005 < T2 < 0.008$ | | |
| $1.40 < R3* < 1.90$ | | | .0897 |
| | $0.04 < T3 < 0.06$ | $1.48 < n3 < 1.55$ | |
| $1.05 < R4 < 1.50$ | | | .0981 |
| | $0.25 < T4 < 0.35$ | | |
| P1**plane | | | .1785 |
| Exit | | | .2771 |

*Mangin mirror surface, transmissive for the first entry of the beam
**second mirror, reflecting for the first incidence of the beam.
The unit of length is the focal length of the objective.

TABLE 2

(optical data)

| | |
|---|---|
| Wavelength of the light | 0.6328 $\mu$m |
| Relative aperture | F/115 |
| Field angle | +/− 15 degrees |
| Scanning height | +/− 0.261926 |
| Focal length | 1.000 |
| Offset distance entry beam | 0.021827 |
| Type of glass used | 517642 |
| Theoretical error in linearity | +/− $2.043 \cdot 10^{-5}$ |

Within the scope of such an objective, it is also possible to use two meniscus lenses instead of one meniscus lens with a relatively great curvature.

Figure 5:
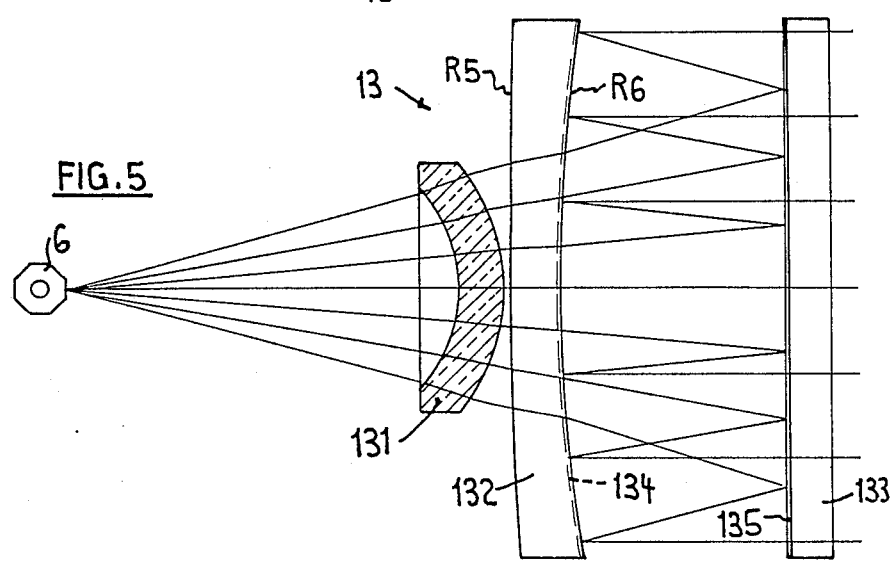
FIG. 5 shows, diagrammatically, a third embodiment of objective according to the invention.

In FIG. 5, a simpler objective is depicted which is likewise telecentric, F-theta-corrected and catadioptric. The lens 13 is composed of a meniscus lens 131, a face-coated mirror 132 and a plane plate 133 which is likewise face-coated. As in the preceding example, the coatings 134 on the mirrors 132 and 135 on the plane plate 133 are only partially effected in order to avoid obscuring the beam. Here, too, either the coated mirror 132 and the plane plate 133 can be inclined in relation to the ray path or the elements can be kept centred in conventional manner and the beam be taken through the objective offset and inclined. The values for this objective vary within the scope of Table 1 with the exception of the values for the reflecting mirror 132 because the rays only travel once through it. The values for R5 may vary between 6.5 and 8.5 and the values of R6 between 1.5 and 2.00.

It is also possible, however, within the scope of this invention, to use more meniscus lenses instead of one or two and to use a plate or mirror which is likewise curved instead of a plane plate. As can be seen from FIGS. 1, 3 and 5, the plane plate or curved mirror can be provided with a reflecting coating on the front or rear face. If a curved mirror is used instead of a plane plate and this is mirror-coated on the second face, the corresponding values for the other optical elements are naturally altered. The coating of the mirrors is effected by conventional vapour-deposition processes or by chemical means. As can be seen from FIGS. 2 and 4, the mirror element and the plane plate are rectangular strips but they may, of course, also be circular mirror or plates. It is likewise also possible to make the meniscus lens other than round.

Whereas in the above it is exclusively a question of spherical or plane elements, it is also possible to construct an objective with cylindrical optical elements so as to obtain an exit beam which lies substantially in one plane which also leads to advantages in the evaluation.

I claim:

1. An apparatus for contact-free measurement of an object by means of a telecentric light beam scanning said object, comprising a light source for emitting a light beam, means for deflecting this light beam with an angular velocity, optical means having an optical axis, for transforming said deflected light beam into said telecentric scanning light beam substantially in the direction of said optical axis for scanning said object, said optical means comprising an F-theta corrected objective comprising a meniscus lens adjacent said means for deflecting said beam, the radii of curvature of said meniscus lens effecting a refraction depending on the angle of deflection of said beam, and two catadioptric elements at the side of said meniscus lens opposite to said means for deflecting the light beam, the dimension of each of said catadioptric elements in a direction perpendicular to the optical axis exceeding the dimension of said meniscus lens, reflecting means on each of said catadioptric elements for said beam, said deflected light beam being thereby transformed into a telecentric light beam of which the scanning velocity is proportional to said angular velocity.

2. An apparatus as claimed in claim 1, wherein one of the catadioptric elements is a spherical mirror.

3. An apparatus as claimed in claim 1, said optical means comprising cylindrical optical elements.

4. An apparatus as claimed in claim 1, wherein the catadioptric elements are partially covered with a reflecting coating.

5. An apparatus as claimed in claim 4, wherein the catadioptric elements are tilted with respect to the optical axis in order, together with the reflecting coating, to avoid obscuring of the beam emerging from the objective.

6. An apparatus as claimed in claim 4, wherein the beam is offset and inclined in relation to the optical axis of the objective in order, together with the reflecting coating, to avoid obscuring of the beam emerging from the objective.

7. An apparatus as claimed in claim 1, wherein the optical elements are of rectangular cross section.

8. An apparatus as claimed in claim 1, wherein said light source comprises a helium-neon laser, two adjustable deflecting mirrors, a widening optical system disposed between the two deflecting mirrors and a revolving mirror from which the beam is deflected and reaches the objective, all parts being disposed in a housing.

9. An apparatus for contact-free measurement of an object by means of a telecentric light beam scanning said object, comprising a light source for emitting a light beam, means for deflecting this light beam with an angular velocity, optical means having an optical axis, for transforming said deflected light beam into said telecentric scanning light beam substantially in the direction of said optical axis for scanning said object, said optical means comprising an F-theta corrected objective comprising a meniscus lens adjacent said means for deflecting said beam, a first catadioptric element at the side of said meniscus lens opposite to said means for deflecting the light beam, said first catadioptric element having curved surfaces, and a second catadioptric element having plane surfaces at the outlet of said optical means, at least one dimension of each of said catadioptric elements in a direction perpendicular to said optical axis exceeding the dimension of said meniscus lens, and each of said catadioptric elements having reflecting means for said beam said deflected light beam being thereby transformed into a telecentric light beam of which the scanning velocity is proportional to said angular velocity.

10. An apparatus according to claim 9, wherein said means for deflecting the light beam, said meniscus lens, said first catadioptric element and said second catadioptric element are spaced from each other by distances T0, T2 and T4 respectively, said meniscus lens has a thickness of T1 and radii of curvature R1 and R2, said first catadioptric element has a thickness T3 and radio of curvature R3 and R4, said distances and thicknesses being measured in said optical axis, these parameters and the refractive index being as follows:

| Radius of curvature | Thickness or spacing | Refractive index |
| --- | --- | --- |
| Entrance | | |
| $-0.150 < R1 < -0.105$ | $0.20 < T0 < 0.275$ | |
| | $0.032 < T1 < 0.040$ | $1.48 < n1 < 1.55$ |
| $-0.185 < R2 < -0.155$ | | |
| | $0.005 < T2 < 0.008$ | |
| $1.40 < R3^* < 1.90$ | | |
| | $0.04 < T3 < 0.06$ | $1.48 < n3 < 1.55$ |
| $1.05 < R4 < 1.50$ | | |
| | $0.25 < T4 < 0.35$ | |

11. An apparatus for contact-free measurement of an object by means of a light beam scanning said object, comprising a light source for emitting a light beam, means for deflecting this light beam substantially in the direction of said optical axis for scanning said object, said optical means comprising an F-theta corrected objective comprising a lens adjacent said means for deflecting said beam, and two catadioptric elements at the side of said lens opposite to said means for deflecting the light beam, the dimension of said catadioptric elements in a direction perpendicular to the optical axis exceeding the dimension of said lens, said deflected light beam being thereby transformed into a telecentric light beam of which the scanning velocity is proportional to said angular velocity, said catadioptric elements being strip-shaped and extending substantially in said deflecting plane, each of said catadioptric elements having an elongated mirror extending along one side thereof and a light transmitting zone extending along the other side thereof, said beam being transmitted through each of said elements at said light-transmitting zone and reflected by said mirror, said deflected beam and said telecentric beam being in parallel planes adjacent each other.

* * * * *